(12) United States Patent
Fujisaki (10) Patent No.: US 8,942,374 B2
(45) Date of Patent: Jan. 27, 2015

(54) ENCRYPTION DEVICE

(75) Inventor: Koichi Fujisaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 216 days.

(21) Appl. No.: 13/218,799

(22) Filed: Aug. 26, 2011

(65) Prior Publication Data

US 2012/0230492 A1    Sep. 13, 2012

(30) Foreign Application Priority Data

Mar. 8, 2011  (JP) ................................ 2011-050698

(51) Int. Cl.
*H04L 9/00*  (2006.01)
*H04L 9/06*  (2006.01)

(52) U.S. Cl.
CPC ......... *H04L 9/0637* (2013.01); *H04L 2209/046* (2013.01); *H04L 2209/12* (2013.01)
USPC ................ 380/28; 380/29; 380/277

(58) Field of Classification Search
CPC ............ H04L 9/0637; H04L 2209/046; H04L 2209/12
USPC ................ 380/28–29, 37, 259, 277
See application file for complete search history.

(56) References Cited

U.S. PATENT DOCUMENTS

| 6,917,684 | B1 * | 7/2005 | Tatebayashi et al. | 380/44 |
|---|---|---|---|---|
| 7,602,906 | B2 * | 10/2009 | Ferguson | 380/29 |
| 8,036,377 | B1 * | 10/2011 | Poo et al. | 380/28 |
| 8,170,205 | B2 * | 5/2012 | Takeda | 380/37 |
| 2004/0131182 | A1 * | 7/2004 | Rogaway | 380/37 |
| 2004/0146158 | A1 * | 7/2004 | Park | 380/37 |
| 2005/0286720 | A1 * | 12/2005 | Fukuoka et al. | 380/255 |
| 2009/0016525 | A1 * | 1/2009 | Bertoni et al. | 380/200 |
| 2009/0060197 | A1 * | 3/2009 | Taylor et al. | 380/277 |
| 2011/0085657 | A1 * | 4/2011 | Matthews, Jr. | 380/28 |
| 2011/0123020 | A1 * | 5/2011 | Choi et al. | 380/28 |
| 2011/0191599 | A1 * | 8/2011 | Chou et al. | 713/193 |
| 2011/0255689 | A1 * | 10/2011 | Bolotov et al. | 380/42 |

OTHER PUBLICATIONS

IEEE P1619/ D16 Standard for Cryptographic Protection of Data on Block-Oriented Storage Devices, IEEE, 2007.*
Mohammad A. Alomari et al., A Parallel XTS Encryption Mode of Operation, IEEE, 2009.*
U.S. Appl. No. 13/037,710, filed Mar. 1, 2011, Koichi Fujisaki.
U.S. Appl. No. 13/158,597, filed Jun. 13, 2011, Yuki Nagata et al.

(Continued)

*Primary Examiner* — Shanto M Abedin
(74) *Attorney, Agent, or Firm* — Oblon, Spivak, McClelland, Maier & Neustadt, L.L.P.

(57) ABSTRACT

According to an embodiment, an encryption device includes a symmetric-key operation unit; a division unit; an exclusive OR operation unit; a multiplication unit that performs multiplication on a Galois field; and a control unit that controls the above units. When the input data is divided into blocks, with the predetermined length, and the first mode of operation is designated on a (j−1)-th block, the control unit performs control such that the multiplication unit performs multiplication with a predetermined value based on the (j−1)-th block, performs control such that the exclusive OR operation unit sums a multiplication result and data of a j-th block, and performs control such that the exclusive OR operation unit sums an operation result of the exclusive OR operation unit and an operation result of the multiplication unit on the (j−1)-th block.

8 Claims, 5 Drawing Sheets

(56) References Cited

OTHER PUBLICATIONS

Morris Dworkin, "Recommendation for Block Cipher Modes of Operation" NIST Special Publication 800-38A, 2001, 66 Pages.

Morris Dworkin, "Recommendation for Block Cipher Modes of Operation: the XTS-AES Mode for Confidentiality on Storage Devices" NIST Special Publication 800-38E, Jan. 2010, 10 Pages.

* cited by examiner

ENCRYPTION DEVICE

CROSS-REFERENCE TO RELATED APPLICATION(S)

This application is based upon and claims the benefit of priority from Japanese Patent Application No. 2011-050698, filed on Mar. 8, 2011; the entire contents of which are incorporated herein by reference.

FIELD

Embodiments described herein relate generally to an encryption device.

BACKGROUND

An cryptographic algorithm of a symmetric-key is designed to conceal data formed of a plurality of blocks, each of which having a predetermined block length. For this reason, using the symmetric-key algorithm, there has been developed an operation method of concealing data longer than the block length or an operation method of generating an authentication code for detecting manipulation of original data. An operation method for a variety of uses based on the symmetric-key encryption type is called an mode of operation.

A standard mode of operation is disclosed in FIPS PUB SP800 series. For example, as an operation method for encrypting data that is longer than the block length, there is a cipher-block chaining (CBC) mode disclosed in FIPS PUB SP800-38A.

In the CBC mode, at the time of storage in a storage device, plain text and encrypted data may be different in data length. Specifically, when the length of plain text is not an integer multiple of the block length, the data length of cipher text is longer than the data length of the plain text. Therefore, there has been required a mode of operation in which the data length is same before and after encryption, and so a mode of operation for a storage device has been developed.

A mode of operation for a storage device has been standardized by IEEE P1619-Std-2007. The mode of operation standardized by IEEE P1619-Std-2007 has been approved as SP800-38E (an XEX encryption mode with tweak and ciphertext stealing (XTS) mode) in FIPS PUB SP800-38 Series that has set the mode of operation.

In the past, however, the CBC mode has been mainly used. Thus, in order to maintain compatibility with a conventional system, it is necessary to support the conventional CBC mode as well as the XTS mode as the encryption type of data inside the storage device. That is, it is necessary to prepare an encryption circuit that supports two use modes, the XTS mode and the CBC mode.

DETAILED DESCRIPTION

According to an embodiment, an encryption device includes a symmetric-key operation unit that performs operations of a first mode of operation and a second mode of operation of a symmetric-key encryption type; a division unit that divides input data into blocks, each having a predetermined length; an exclusive OR operation unit that performs an exclusive OR operation; a multiplication unit that performs multiplication on a Galois field; and a control unit that controls the symmetric-key operation unit, the exclusive OR operation unit, and the multiplication unit. When the division unit divides the input data into blocks, and the first mode of operation is designated on a (j−1)-th block divided from the input data (j is an integer equal to or more than 2), the control unit performs control such that the multiplication unit performs multiplication with a predetermined value based on the (j−1)-th block of the input data, performs control such that the exclusive OR operation unit performs an exclusive OR operation of a multiplication result by the multiplication unit and data of a j-th block of the input data, and performs control such that the exclusive OR operation unit performs an exclusive OR operation of an operation result of the exclusive OR operation unit and an operation result of the multiplication unit on the (j−1)-th block, and when the division unit divides the input data into blocks, and the second mode of operation is designated on the (j−1)-th block divided from the input data (j is an integer equal to or more than 2), the control unit performs control such that the exclusive OR operation unit performs an exclusive OR operation of an operation result of the symmetric-key operation unit on the (j−1)-th block of the input data and data of the j-th block of the input data, and performs control such that the symmetric-key operation unit performs operations of the first mode of operation and the second mode of operation on an operation result of the exclusive OR operation unit.

Hereinafter, exemplary embodiments of an encryption device will be described in detail with reference to the accompanying drawings.

First Embodiment

An encryption device according to a first embodiment commonalizes an operation unit which can be commonalized by an operation unit used in the XTS mode and the CBC mode. Each operation unit is controlled to execute an operation according to a designated mode of operation.

Figure 1:
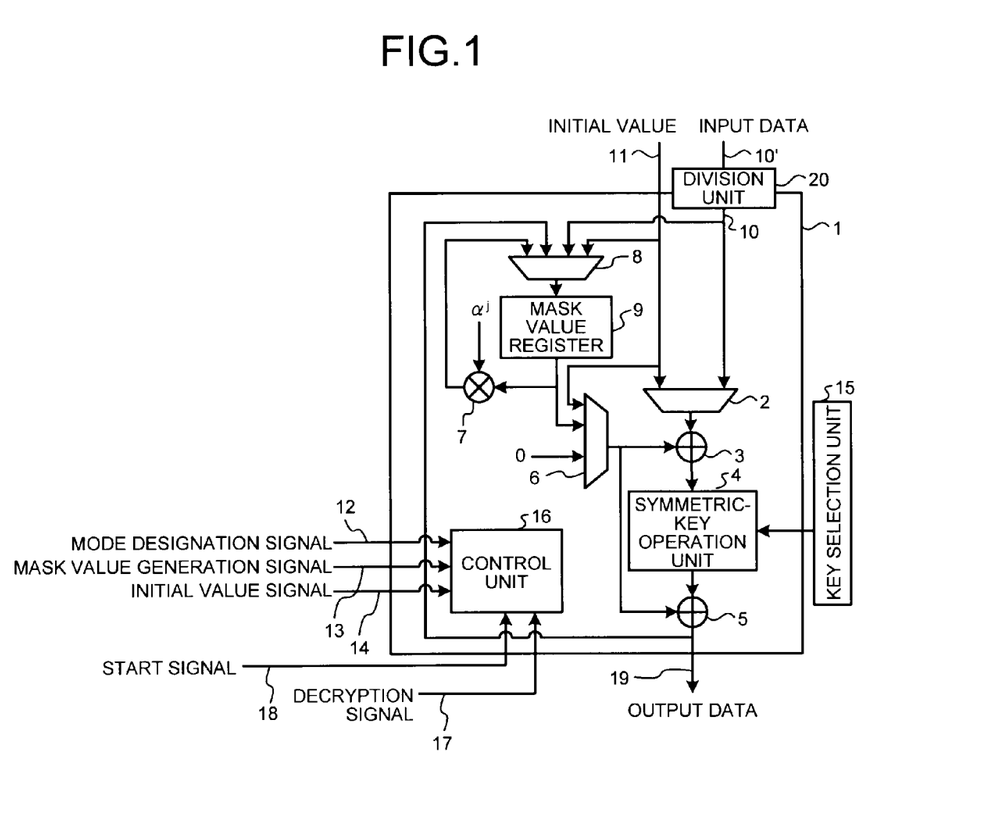
FIG. 1 is a circuit configuration diagram of an encryption device according to a first embodiment.

FIG. 1 is a block diagram illustrating an example of a circuit configuration of an encryption device 1 according to the first embodiment. As illustrated in FIG. 1, the encryption device 1 includes a selector 2, an exclusive OR operation unit 3, a symmetric-key operation unit 4, an exclusive OR operation unit 5, a selector 6, a multiplication unit 7, a selector 8, a mask value register 9, a control unit 16, and a division unit 20. The encryption device 1 is connected to a key selection unit 15.

The key selection unit 15 selects key data corresponding to an instruction from the control unit 16 and outputs the selected key data to the symmetric-key operation unit 4. The key selection unit 15 may be configured to be provided inside the encryption device 1.

The division unit 20 divides input data 10', which is a target of an encryption or a decryption and is input into the encryption device 1, into units of a predetermined length (a fixed length). For example, the division unit 20 divides the input data 10' into blocks with 128-bit length. The division unit 20 may be configured to be provided outside the encryption device 1. Hereinafter, processing is performed in units of data obtained by dividing the input data 10' into fixed length through the division unit 20. Hereinafter, data obtained by dividing the input data 10' is referred to as an input data signal 10.

The selector 2 selects either the input data signal 10 or an initial value input signal 11 in response to an instruction from the control unit 16. The exclusive OR operation unit 3 calculates an exclusive OR of an output of the selector 2 and an output of the selector 6.

The symmetric-key operation unit 4 executes an operation of an mode of operation instructed by the control unit 16 using the operation result of the exclusive OR operation unit 3 and the key data selected by the key selection unit 15. In the present embodiment, the symmetric-key operation unit 4 executes operation processes of the XTS mode and the CBC mode of the encryption algorithm of the symmetric-key type (the block encryption type). The operation process includes encryption of input data (hereinafter, referred to as an encryption) and decryption of encrypted data (hereinafter, referred to as a decryption).

The exclusive OR operation unit 5 calculates an exclusive OR of the output of the selector 6 and the operation result of the symmetric-key operation unit 4. The selector 6 selects any one of a predetermined value, a value of the mask value register 9, and the initial value input signal 11 in response to an instruction from the control unit 16. FIG. 1 illustrates an example in which zero (0) is used as the predetermined value, but the predetermined value may a value other than zero (0).

The multiplication unit 7 executes multiplication on the Galois field. Specifically, the multiplication unit 7 outputs a result of multiplying a value of the mask value register 9 by the j-th power of a predetermined primitive polynomial α on the Galois field (j is a number representing an order of a block obtained by dividing the input data into the fixed lengths).

The selector 8 selects any one of the operation result of the multiplication unit 7, the operation result of the exclusive OR operation unit 5, the input data signal 10, and the initial value input signal 11 in response to an instruction from the control unit 16. The mask value register 9 stores an output of the selector 8.

The control unit 16 controls calculating output data obtained by operating input data in the XTS mode when the XTS mode is designated and controls calculating output data obtained by operating input data in the CBC mode when the CBC mode is designated. The details of each processing will be described later.

Figure 2:
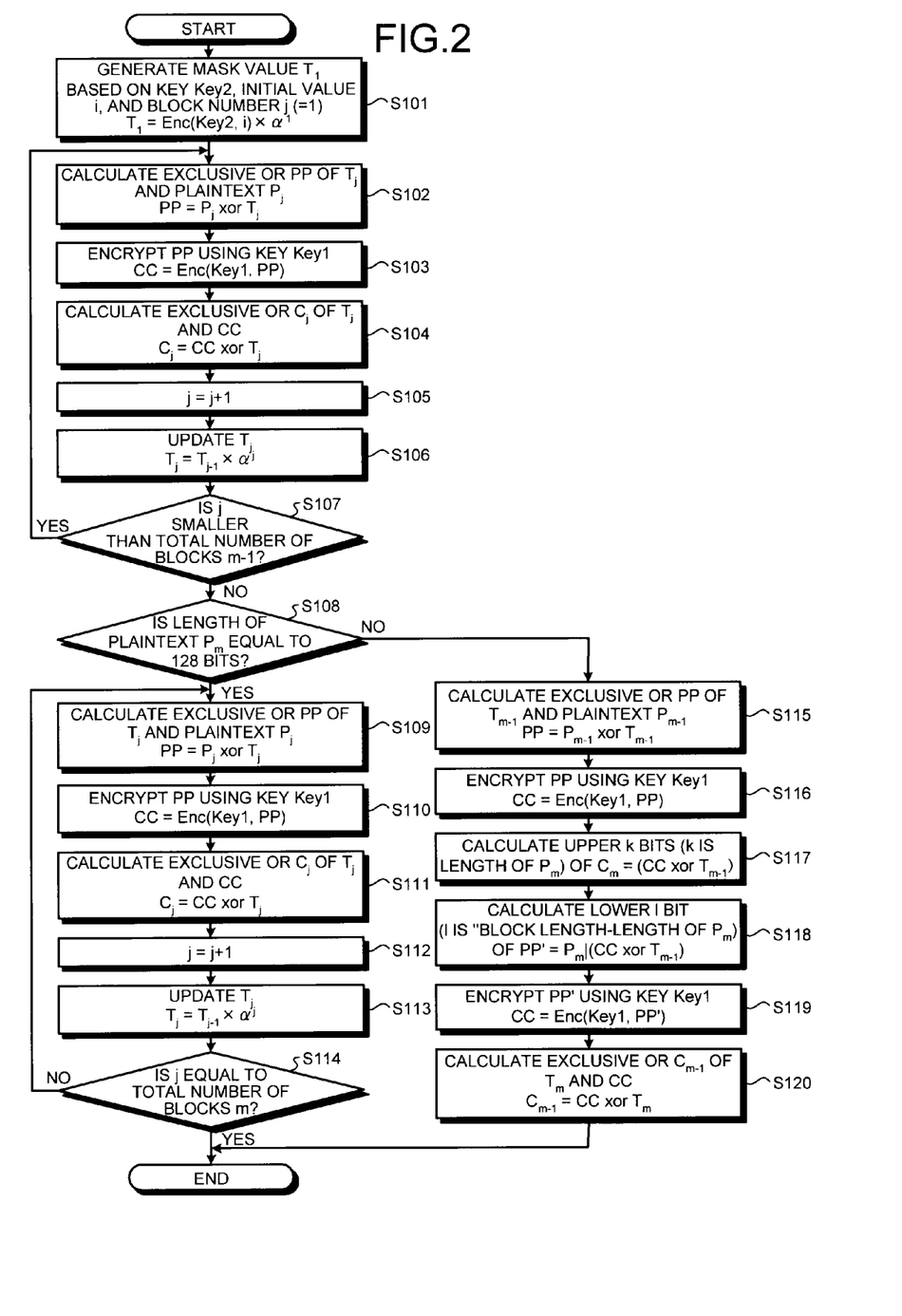
FIG. 2 is a flowchart of an operation process of an XTS mode according to the first embodiment.

Next, described will be an operation process by the encryption device 1 having the above configuration according to the first embodiment. First, described is an operation process of the XTS mode. FIG. 2 is a flowchart illustrating the overall flow of the operation process of the XTS mode according to the first embodiment.

Each of the steps of FIG. 2 is executed by the control unit 16 controlling each configuration unit among the above mentioned configuration units (the selector 2, the exclusive OR operation unit 3, the symmetric-key operation unit 4, the exclusive OR operation unit 5, the selector 6, the multiplication unit 7, the selector 8, and the mask value register 9). The details of a method of controlling the configuration units through the control unit 16 will be described later and so will not be described in a description of FIG. 2.

As illustrated in FIG. 2, in step S101, in the XTS mode, the symmetric-key operation unit 4 of the encryption device 1 generates a mask value $T_1$ based on a key Key2, an initial value i (a sector number), and a block number j(=1).

Next, the division unit 20 divides input data that is to be encrypted. In step S102, the exclusive OR operation unit 3 performs an exclusive OR operation of divided data (hereinafter, referred to as "plaintext $P_j$") and a mask value $T_j$ and calculates PP(=$P_j$ xor $T_j$). The plaintext $P_j$ represents a plaintext of a j-th block when the entire plaintext, which is to be encrypted, is divided into m blocks (m is an integer equal to or more than 2). The mask value $T_j$ represents a mask value used for processing of the j-th block. A description will be made below in connection with a case of dividing input data into blocks of 128-bit length as an example, but the block length is not limited to 128 bits.

In step S103, the symmetric-key operation unit 4 encrypts the result PP of the exclusive OR operation using a key Key1 to calculate data CC. In step S104, the exclusive OR operation unit 5 performs an exclusive OR operation of the data CC and the mask value $T_j$ calculate a ciphertext $C_j$ (=CC xor $T_j$).

In step S105, the control unit 16 adds one (1) to j. In step S106, the multiplication unit 7 updates the mask value by "$T_j=T_{j-1} \times \alpha^j$." In step S107, the control unit 16 judges whether or not j is smaller than (m−1) (m is a total number of blocks). When it is judged that j is smaller than (m−1) (Yes in step S107), the process returns to step S102, and the process is repeated.

In Step 108, when it is judged that j reaches (m−1) (No in step S107), the control unit 16 judges whether or not the length of a plaintext $P_m$ is equal to 128 bits which is the block length.

When it is judged that the length of the plaintext $P_m$ is equal to 128 bits (Yes in step S108), step S109 to step S113 are repetitively performed on (m−1)-th and m-th blocks which are the remaining blocks. Step S109 to step S113 are the same processes as step S102 to step S106, and thus a description thereof will not be repeated.

When it is judged that j reaches m (Yes in step S114), that is, when processing up to the m-th block has been completed, the operation process is finished.

Meanwhile, when it is judged in step S108 that the length of the plaintext $P_m$ is not equal to 128 bits (No in step S108), in step S115, the exclusive OR operation unit 3 performs an exclusive OR operation of a plaintext and a mask value $T_{m-1}$ to calculate PP(=$P_{m-1}$ xor $T_{m-1}$).

In step S116, the symmetric-key operation unit 4 encrypts the result PP of the exclusive OR operation using the key Key1 and calculates data CC. The exclusive OR operation unit 5 calculates "CC xor $T_{m-1}$", which is an exclusive OR of data CC and a mask value $T_{m-1}$. In step S117, the symmetric-key operation unit 4 calculates a ciphertext $C_m$ which is upper k bits (k is the length of $P_m$) of "CC xor $T_{m-1}$." In step S118, the symmetric-key operation unit 4 calculates data PP' in which $P_m$ is connected with a lower 1 bit of "CC xor $T_{m-1}$" (1 is "block length-length of $P_m$"). In step S119, the symmetric-key operation unit 4 calculates data CC obtained by encrypting the data PP' using the key Key1. In step S120, the exclusive OR operation unit 5 performs an exclusive OR operation of the data CC and the mask value $T_m$ to calculate a ciphertext $C_{m-1}$(=CC xor $T_m$), and then the operation process is finished.

Next, described will be an encryption procedure of the XTS mode. First, a mode designation signal 12 is asserted, and setting for performing an operation of the XTS mode is set. For example, each signal input into the control unit 16 such as the mode designation signal 12 or the like is asserted or de-asserted by an external device (not shown) connected to the encryption device 1.

A mask value generation signal 13 for notifying generation of the mask value T is asserted; an initial value for generating the mask value T is input into the initial value input signal 11; and a start signal 18 is asserted.

As the start signal 18 is asserted, the control unit 16 transmits a signal, which enables the selector 6 to output the predetermined value "0", through a control signal line (not shown). Further, the control unit 16 notifies the selector 2 of an event of generating mask value through a control signal line (not shown).

The selector 2 selects the initial value (the initial value input signal 11) in response to an instruction from the control unit 16. An output result of the selector 2 is input into the exclusive OR operation unit 3. The exclusive OR operation unit 3 performs an exclusive OR operation of the output result of the selector 2 and the output result of the selector 6. The operation result of the exclusive OR operation unit 3 is input into the symmetric-key operation unit 4.

On the other hand, as the mask value generation signal 13 for generating the mask value T and the start signal 18 are asserted, the control unit 16 notifies the key selection unit 15 that the mask value are to be generated, through a control signal line (not shown).

When it is judged that it is mask value generation of the XTS mode, the key selection unit 15 selects a key Key2 necessary for mask value generation and inputs the key Key2 into the symmetric-key operation unit 4.

When the initial value and the key Key2 are input, the symmetric-key operation unit 4 starts an operation of the mask value T (step S101 in FIG. 2). When the operation of the mask value T is finished, the control unit 16 transmits a signal for performing writing of the mask value T into the mask value register 9 through a control signal line (not shown). Accordingly, the mask value T is retained in the mask value register 9.

Next, in order to perform encryption of the plaintext $P_j$, the mask value generation signal 13 is de-asserted; a plaintext is input into the input data signal 10; and the start signal 18 is asserted. At this time, as the mask value generation signal 13 is de-asserted, the control unit 16 notifies the key selection unit 15 of an event of an encryption of a plaintext. The key selection unit 15 selects the key Key1 and inputs the key Key1 to the symmetric-key operation unit 4.

When the mode designation signal 12 is asserted and the mask value generation signal 13 is de-asserted by a device (not shown) that manages control of the encryption device 1 and inputting of data, the control unit 16 gives a notification to the selector 2 to select the value of the input data signal 10. The selector 2 selects the input data of the input data signal 10 to output. Further, the control unit 16 instructs the selector 6 to select the value of the mask value register 9. The selector 6 selects the value of the mask value register 9 to output.

Next, the exclusive OR operation unit 3 performs an exclusive OR operation of the value of the mask value register 9 which is the output value of the selector 6 and the plaintext input from the input data signal 10 which is the output value of the selector 2 (step S102 in FIG. 2). The operation result is input into the symmetric-key operation unit 4.

When the key data from the key selection unit 15 and the operation result from the exclusive OR operation unit 3 are input, the symmetric-key operation unit 4 starts an operation, asserts a finish signal (not shown) to notify the control unit 16 of the operation finish, and outputs an operation result (step S103 in FIG. 2). The exclusive OR operation unit 5 calculates an exclusive OR of the output result of the symmetric-key operation unit 4 and the output of the selector 6 (step S104 in FIG. 2). A ciphertext is output as the output result of the exclusive OR operation unit 5.

At the same time the ciphertext is output, the multiplication unit 7 performs a multiplication operation to the value of the mask value register 9 (step S106 in FIG. 2). The operation result is input to the selector 8. The selector 8 selects the result of the multiplication unit 7 in response to an instruction from the control unit 16. The mask value register 9 writes the output result of the selector 8 in response to an instruction from the control unit 16, and then the encryption is finished.

Next, described is a decryption of the XTS mode. In the decryption of the XTS mode, a procedure of generating the mask value T is the same as in the encryption. The mode designation signal 12 and the mask value generation signal 13 are asserted, and the initial value is input.

As the mode designation signal 12 and the mask value generation signal 13 are asserted, the control unit 16 instructs the selector 6 to output the predetermined value "0". Further, the control unit 16 instructs the selector 2 to select the value of the initial value input signal 11. The key selection unit 15 selects the key Key2 in response to an instruction from the control unit 16 and inputs the key Key2 into the symmetric-key operation unit 4.

The symmetric-key operation unit 4 starts to generate the mask value T when the output of the exclusive OR operation unit 3 as an input of the symmetric-key operation unit 4 and the output of the key selection unit 15 as key data are prepared. When the operation of the mask value T is finished, the symmetric-key operation unit 4 asserts a finish signal (not shown) to notify the control unit 16 of the operation finish and outputs the mask value T. At this time, since the selector 6 has selected the fixed value "0", as a result of performing an operation of the output of the selector 6 and the output of the symmetric-key operation unit 4 through the exclusive OR operation unit 5, the output result of the symmetric-key operation unit 4 is output from the exclusive OR operation unit 5.

When the mask value T is generated, the control unit 16 notifies the selector 8 and the mask value register 9 of an instruction so that the mask value T is written into the mask value register 9.

Next, in order to perform the decryption, the mask value generation signal 13 is de-asserted, and a ciphertext is set to the input data signal 10. The key selection unit 15 selects the key Key1 and inputs the key Key1 to the symmetric-key operation unit 4. Here, at the time of the encryption, a time taken for the decryption may be reduced by using a decryption key. In this case, the key selection unit 15 selects a decryption key for the key Key1 and inputs the decryption key for the key Key1 to the symmetric-key operation unit 4.

Since the mask value generation signal 13 is de-asserted, the control unit 16 instructs the selector 2 to select the value of the input data signal 10. The control unit 16 further instructs the selector 6 to select the value of the mask value register 9. Thus, the exclusive OR operation unit 3 calculates an exclusive OR of the output of the selector 6 and the output result of the selector 2. The operation result is input into the symmetric-key operation unit 4.

When the key data which is the output data of the key selection unit 15 and the output data of the exclusive OR operation unit 3 are input, and a decryption start signal (not shown) is asserted from the control unit 16; the symmetric-key operation unit 4 starts the decryption. When the operation of the symmetric-key operation unit 4 is finished, a finish signal (not shown) is output. The exclusive OR operation unit 5 performs an exclusive OR operation of the output result of the symmetric-key operation unit 4 and the output of the selector 6. A plaintext is output from an output signal line 19 as the operation result.

Meanwhile, when the symmetric-key operation unit 4 asserts the finish signal (not shown), the multiplication unit 7 performs a multiplication operation using the value of the mask value register 9 as an input value so as to update the value of the mask value register 9. The operation result of the multiplication unit 7 is stored in the mask value register 9 via the selector 8.

Figure 3:
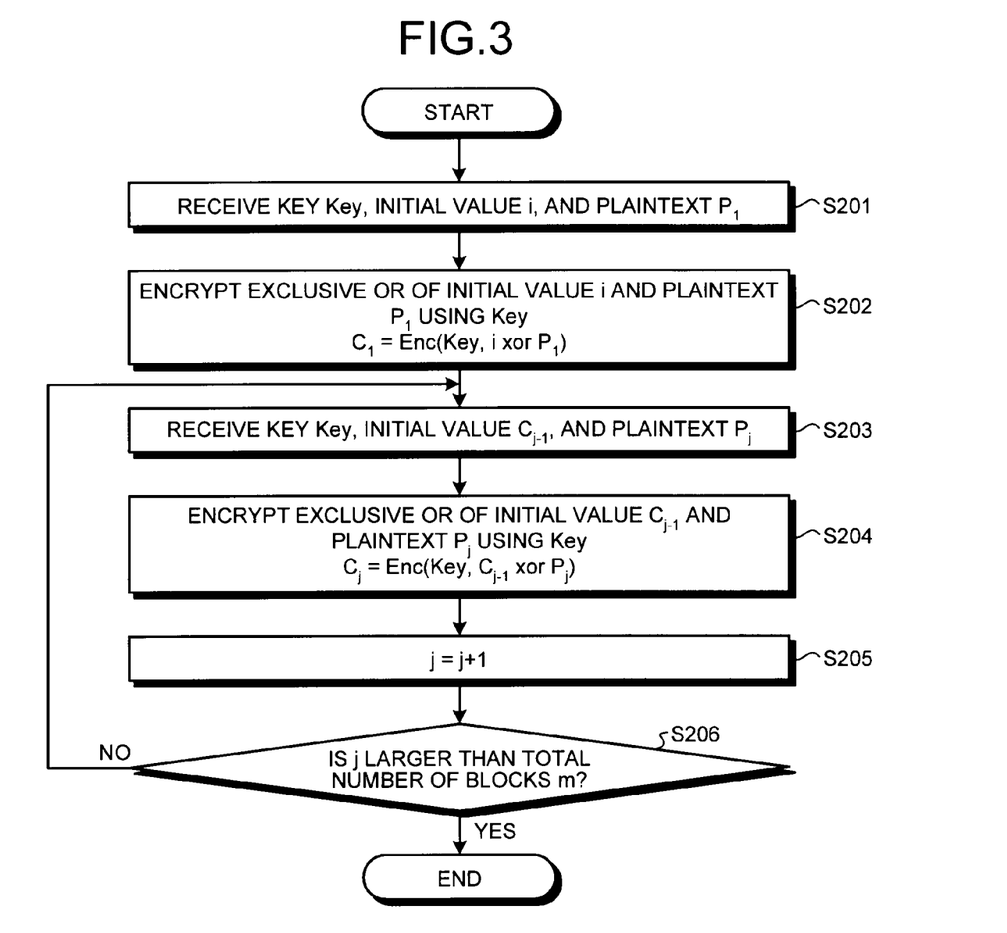
FIG. 3 is a flowchart of an encryption of a CBC mode according to the first embodiment.

Next, described will be an operation process of the CBC mode. First, an encryption of the CBC mode will be described. FIG. 3 is a flowchart illustrating the overall flow of the encryption of the CBC mode according to the first embodiment.

In step S201, the encryption device 1 receives a key Key, an initial value i, and a plaintext $P_1$. In step S202, the exclusive OR operation unit 3 performs an exclusive OR operation of the initial value i and the plaintext $P_1$; and the symmetric-key operation unit 4 outputs an operation result $C_1$ obtained by encrypting the operation result of the exclusive OR using the key Key. Further, in step S203, when encryption is performed, the symmetric-key operation unit 4 receives the key Key, an encryption result (here, j is an integer equal to or more than 2), and a plaintext $P_j$. In step S204, the exclusive OR operation unit 3 performs an exclusive OR operation of an operation result and a plaintext $P_1$; and the symmetric-key operation unit 4 outputs an operation result $C_j$ obtained by encrypting the operation result of the exclusive OR by using the key Key. In step S205, the control unit 16 adds one (1) to j. In step S206, the control unit 16 judges whether or not j is larger than m which is a total number of blocks. When it is judged that j is not larger than m which is a total number of blocks (No in step S206), the process returns to step S203, and the process is repeated. However, when it is judged j is larger than m which is a total number of blocks (Yes in step S206), the encryption device 1 finishes the operation process.

Figure 4:
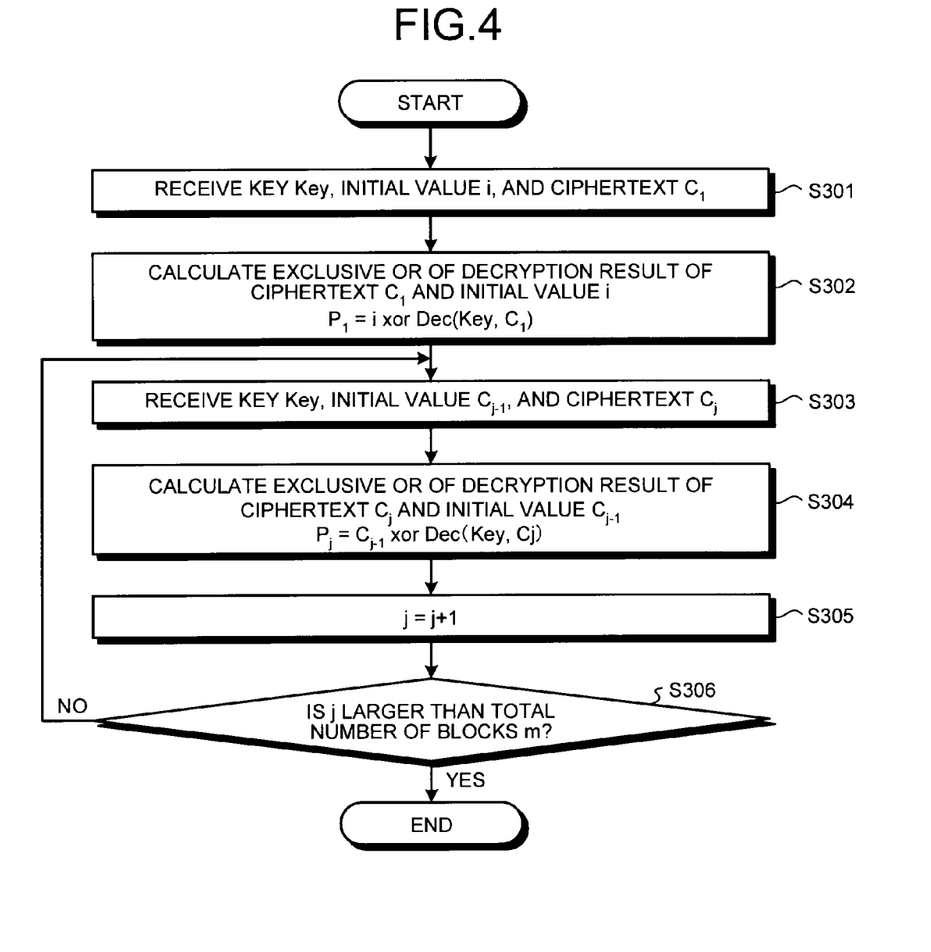
FIG. 4 is a flowchart of a decryption of the CBC mode according to the first embodiment.

Next, described will be a decryption of the CBC mode. FIG. 4 is a flowchart illustrating the overall flow of the decryption of the CBC mode according to the first embodiment.

In step S301, the encryption device 1 receives the key Key, the initial value i, and the ciphertext $C_1$. In step S302, the exclusive OR operation unit 3 calculates the plaintext $P_1$ which is an exclusive OR of an operation result "Dec(Key, $C_1$)" obtained by decrypting the ciphertext $C_1$ and the initial value i. Further, in step S303, when decryption is performed, the symmetric-key operation unit 4 receives the key Key, a ciphertext of a previous block used as the initial value (hereinafter, referred to as "initial value $C_{j-1}$"), and a ciphertext $C_j$. In step S304, the exclusive OR operation unit 5 calculates the plaintext $P_j$ which is an exclusive OR of an operation result obtained by decrypting the ciphertext $C_j$ through the symmetric-key operation unit 4 and the initial value $C_{j-1}$. In step S305, the control unit 16 adds one (1) to j. In step S306, the control unit 16 judges whether or not j is larger than m which is a total number of blocks. When it is judged that j is not larger than m (No in step S306), the process returns to step S303 and the process is repeated. However, when it is judged j is larger than m which is a total number of blocks (Yes in step S306), the encryption device 1 finishes the operation process.

Next, further described will be a procedure of the encryption of the CBC mode. In the encryption of the CBC mode, at the time of the first operation, an initial value signal 14 is asserted, and the mode designation signal 12 which is the input signal of the encryption device 1 is deasserted. Further, a decryption signal 17 is de-asserted; an initial value is set to the initial value input signal 11; and a plaintext is set to the input data signal 10. Further, when the start signal 18 is asserted, the encryption device 1 starts the encryption.

Based on the fact that the initial value signal 14 has been asserted; the mode designation signal 12 has been deasserted; and the decryption signal 17 has been de-asserted, the control unit 16 instructs the selector 2 to select the value of the initial value input signal 11. The exclusive OR operation unit 3 performs an exclusive OR operation of the initial value and the value of the input data signal 10. The result is input to the symmetric-key operation unit 4.

Since an instruction representing the encryption of the CBC mode is transmitted from the control unit 16, the key selection unit 15 transmits key data according to the instruction to the symmetric-key operation unit 4. Thus, the symmetric-key operation unit 4 starts the encryption.

When the encryption is finished, a finish signal (not shown) is asserted and the ciphertext is output from the symmetric-key operation unit 4. At this time, the control unit 16 instructs the selector 6 to select "0". The selector 6 outputs "0" according to the instruction.

The exclusive OR operation unit 5 performs an exclusive OR operation of the output value of the selector 6 and the output of the symmetric-key operation unit 4. The ciphertext is output to the output signal line 19 as the operation result (step S202 in FIG. 3). At this time, for the preparation of a next operation, the control unit 16 gives an instruction for storing the output result of the exclusive OR operation unit 5 into the mask value register 9. That is, the control unit 16 instructs the selector 8 to select an input to the output signal line 19 and also instructs the mask value register 9 to write data. When a next plaintext is input, since the value stored in the mask value register 9 is used as the initial value, the control unit 16 instructs the selector 6 to select the value of the mask value register 9. The exclusive OR operation unit 3 performs an exclusive OR operation of the output of the selector 6 and the output of the selector 2. The symmetric-key operation unit 4 receives the result of this operation and performs the encryption (step S204 in FIG. 3).

Next, a procedure of the decryption of the CBC mode will be further described. In the decryption, the control unit 16 instructs the selector 2 to select a ciphertext that is input. Based on the fact that the mode designation signal 12 has been de-asserted; the decryption signal 17 has been asserted; and the initial value signal 14 has been asserted, the control unit 16 instructs the selector 6 to output "0", and at the same time, in order to write the value of the initial value input signal 11 in the mask value register 9, the control unit 16 instructs the selector 8 to select the value of the initial value input signal 11 and gives a write instruction to the mask value register 9. By this processing, the exclusive OR operation unit 3 performs an exclusive OR operation of the output of the selector 6 and the output of the selector 2. The operation result is input into the symmetric-key operation unit 4.

At this time, based on the fact that the mode designation signal has been de-asserted, the key selection unit 15 selects key data for the data of the CBC mode and inputs the selected key data to the symmetric-key operation unit 4.

When the input data and the key data are input, the symmetric-key operation unit 4 starts the decryption. When the decryption is finished, the symmetric-key operation unit 4 asserts the finish signal and outputs the operation result. At this time, the control unit 16 instructs the selector 6 to select the value of the initial value input signal 11. Thus, the selector 6 selects the value of the initial value input signal 11 and outputs the selected value. The exclusive OR operation unit 5 performs an exclusive OR operation of the value of the initial value input signal 11 and the output of the symmetric-key operation unit 4, and outputs the plaintext as the operation result (step S302 in FIG. 4).

Subsequently, when the decryption is performed, the initial value signal 14 is de-asserted; the ciphertext is input into the input data signal 10; and the start signal 18 is asserted. Based on the fact that the CBC/XTS mode is deasserted; the initial value signal is also de-asserted; and the decryption signal 17 is asserted, the control unit 16 judges that it is the decryption of the CBC mode. The control unit 16 instructs the selector 6 to select "0". Thereafter, the symmetric-key operation unit 4 starts the decryption.

When the decryption is finished, as described above, the exclusive OR operation unit 5 performs an exclusive OR operation of the operation result of the decryption and the value of the mask value register 9. Thus, the plaintext is output to the output signal line 19 as the operation result (step S304 in FIG. 4).

As described above, due to the circuit configuration illustrated in FIG. 1, the encryption device according to the first embodiment can perform the encryption and decryptions in the XTS mode and the encryption and decryptions in the CBC mode.

Second Embodiment

In the decryption of the CBC mode, after the decryption by the symmetric-key operation unit 4 is finished, performed is an exclusive OR operation of the initial value stored in the mask value register 9 and the operation result of the decryption. For this reason, it is difficult to change the value of the mask value register 9 until the operation of the symmetric-key operation unit 4 is finished. That is, after the completion of the operation of the symmetric-key operation unit 4, the value of the input data signal 10 is written in the mask value register 9.

Figure 5:
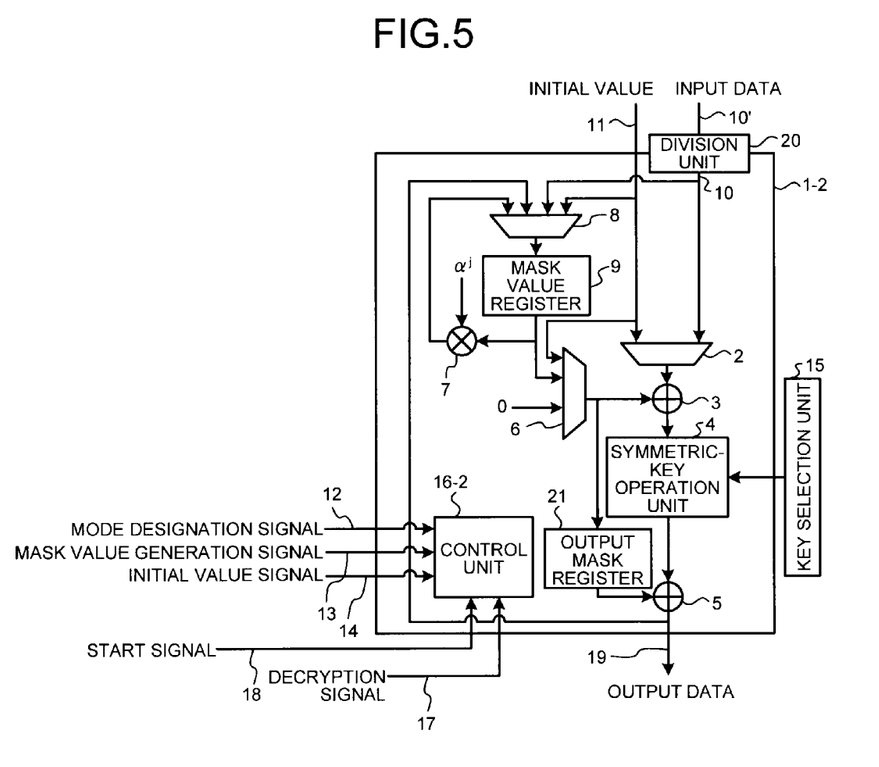
FIG. 5 is a circuit configuration diagram of an encryption device according to a second embodiment.

An encryption device according to a second embodiment further includes a circuit (a register) that retains a value of an input data signal 10 so that a ciphertext for a next decryption can be provided as an input data signal 10 right after the completion of an operation of a symmetric-key operation unit 4.

FIG. 5 is a block diagram illustrating an example of a circuit configuration of an encryption device 1-2 according to the second embodiment. As illustrated in FIG. 5, the encryption device 1-2 is different from that in the first embodiment in that an output mask register 21 is additionally provided and a control unit 16-2 has a different function. Since the other configurations are the same as in FIG. 1 which is the block diagram according to the first embodiment, they are denoted by the same reference numerals and a description thereof will not be repeated.

In the second embodiment, when the decryption of the CBC mode starts, the control unit 16-2 instructs the selector 8 to retain the value of the input data signal 10 (the ciphertext $C_1$) and instructs the output mask register 21 to retain the value of the input data signal 10 through the selector 6.

After the operation of the symmetric-key operation unit 4 is completed, the exclusive OR operation unit 5 performs an exclusive OR operation of the value of the output mask register 21 and the operation result of the symmetric-key operation unit 4. A plaintext is output as the operation result. In the present embodiment, since the value of the ciphertext $C_1$ (the value of the input data signal 10) used for an operation of a next block is retained in the output mask register 21, a next ciphertext $C_2$ can be provided to the input data signal 10 at the same time when the operation of the symmetric-key operation unit 4 is completed.

That is, at the same time when the start signal 18 is asserted so as to start the operation of the ciphertext $C_2$, the control unit 16-2 moves the value of the mask value register 9 to the output mask register 21, while giving an instruction to write the ciphertext $C_2$ in the mask value register 9. By performing this processing, when the operation of the symmetric-key operation unit 4 is completed, it is possible to prepare data for a next decryption and immediately start the decryption. That is, the decryption of the CBC mode can be processed at a high speed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encryption device, comprising:
a symmetric-key operation unit configured to perform operations of a first mode of operation and a second mode of operation of a symmetric-key encryption type, the first mode of operation being different from the second mode of operation;
a division unit configured to divide input data into blocks, each having a predetermined length;
a first register that stores data of any one block of the input data;
an exclusive OR operation unit configured to perform an exclusive OR operation;
a multiplication unit configured to perform multiplication on a Galois field; and
a control unit configured to control the symmetric-key operation unit, the exclusive OR operation unit, and the multiplication unit, wherein the control unit is configured to change operations of the exclusive OR operation unit depending on whether the first or the second mode of operation is designated,
wherein the control unit is further configured to, when the first mode of operation is designated on a (j−1)-th block divided from the input data by the division unit (j is an integer equal to or more than 2),
perform control such that the multiplication unit performs multiplication with a predetermined value based on the (j−1)-th block of the input data,
perform control such that the exclusive OR operation unit performs an exclusive OR operation of a multiplication result by the multiplication unit and data of a j-th block of the input data, and
perform control such that the exclusive OR operation unit performs an exclusive OR operation of an operation result of the exclusive OR operation unit and an operation result of the multiplication unit on the (j−1)-th block, and
the control unit is further configured to, when the second mode of operation is designated on the (j−1)-th block divided from the input data,
perform control such that the exclusive OR operation unit performs an exclusive OR operation of an operation result of the symmetric-key operation unit on the (j−1)-th block of the input data and data of the j-th block of the input data, and
perform control such that the symmetric-key operation unit performs operations of the first mode of operation and the second mode of operation on an operation result of the exclusive OR operation unit.

2. The device according to claim 1,
wherein the symmetric-key operation unit performs a decryption of the symmetric-key encryption type, and
wherein the control unit is further configured to, when a decryption of the second mode of operation is designated on the (j−1)-th block divided from the input data,
store data of the (j−1)-th block of the input data in the first register,
perform control such that the symmetric-key operation unit performs a decryption of the j-th block of the input data, and
perform control such that the exclusive OR operation unit performs an exclusive OR operation of an operation result of the decryption and data of the (j−1)-th block stored in the first register.

3. The device according to claim 2, further comprising a second register that stores data of any one block of the input data, and
wherein the control unit is further configured to, when a decryption of the first mode of operation is designated on the (j−1)-th block divided from the input data,
store data of the (j−1)-th block of the input data in the second register,
perform control such that the symmetric-key operation unit performs a decryption of the j-th block of the input data,
perform control such that the exclusive OR operation unit performs an exclusive OR operation of an operation result of the decryption and data of the (j−1)-th block stored in the second register, and
store data of the j-th block of the input data into the first register.

4. The device according to claim 1,
wherein the first mode of operation is an "XEX encryption mode with tweak and ciphertext stealing" (XTS) mode, and
the second mode of operation is a "cipher block chaining" (CBC) mode.

5. The device according to claim 1, further comprising a key selection unit that
selects key data according to an instruction given from the control unit from among a plurality of key data used for an operation of the symmetric-key operation unit and outputs the selected key data.

6. The encryption device of claim 1, further comprising a selector configured to select an input data signal that is input to the exclusive OR operation unit,
wherein when the first mode of operation is designated, the control unit controls the selector such that the multiplication result and the data of the j-th block are input to the exclusive OR operation unit, and
when the second mode of operation is designated, the control unit performs control such that the operation result of the symmetric-key operation unit and the data of the j-th block are input to the exclusive OR operation unit.

7. The encryption device of claim 1, wherein the control unit is configured to change input signals to the exclusive OR operation unit depending on whether the first or the second mode of operation is designated.

8. The encryption device of claim 1, wherein the exclusive OR operation unit is a hardware circuit.

* * * * *